US010641702B2

(12) United States Patent
Boutami et al.

(10) Patent No.: US 10,641,702 B2
(45) Date of Patent: May 5, 2020

(54) INFRARED RADIATION SOURCE

(71) Applicant: COMMISSARIAT A L'ENERGIE ATOMIQUE ET AUX ENERGIES ALTERNATIVES, Paris (FR)

(72) Inventors: Salim Boutami, Grenoble (FR); Alain Gliere, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/156,139

(22) Filed: Oct. 10, 2018

(65) Prior Publication Data
US 2019/0113446 A1   Apr. 18, 2019

(30) Foreign Application Priority Data
Oct. 12, 2017  (FR) ..................................... 17 59565

(51) Int. Cl.
*G01N 21/00*    (2006.01)
*G01J 3/10*     (2006.01)
(Continued)

(52) U.S. Cl.
CPC .......... *G01N 21/3504* (2013.01); *G01J 3/108* (2013.01); *G01N 21/255* (2013.01);
(Continued)

(58) Field of Classification Search
CPC .... G01J 3/108; G01J 5/02; G01J 5/024; G01J 3/12; G01J 5/023; G01J 5/0803;
(Continued)

(56) References Cited

U.S. PATENT DOCUMENTS 10,401,282 B2 *   9/2019  Boutami ............... G01J 3/0291
2012/0153151 A1*  6/2012  Dumont ................ B82Y 20/00
                                                   250/338.1
(Continued)

FOREIGN PATENT DOCUMENTS

WO    WO 2017/132429 A1    8/2017

OTHER PUBLICATIONS

Barritault et al., "Mid-IR source based on a free-standing microhotplate for autonomous CO2 sensing in indoor applications", Oct. 10, 2011, Sensors and Actuators A 172 (2011) 379-385 (Year: 2011).*
(Continued)

*Primary Examiner* — David A Vanore
(74) *Attorney, Agent, or Firm* — Oblon, McClelland, Maier & Neustadt, L.L.P.

(57) ABSTRACT

A source (100) that includes a membrane, where the membrane includes: an emissive layer (130) including an emissive surface (131); an adaptor (121a, 121b, 121c, 121d), each adaptor (121a, 121b, 121c, 121d) facing a different section of the emissive section (131), called the emissive section (132a, 132b, 132c, 132d), and with which it forms an emissive assembly (134a, 134b, 134c, 134d) adapted to reduce the spectral extent of infrared radiation emitted by the emissive section; and a plurality of heaters (140a, 140b) for heating the emissive layer (130), the heaters (140a, 140b) being arranged so as to impose different relative temperature variations in different emissive sections (132a, 132b, 132c, 132d).

22 Claims, 9 Drawing Sheets

(51) Int. Cl.
*G01N 21/3504* (2014.01)
*G01N 21/25* (2006.01)
*G01J 3/12* (2006.01)

(52) U.S. Cl.
CPC .............. *G01J 2003/1226* (2013.01); *G01N 2201/06186* (2013.01)

(58) Field of Classification Search
CPC ............ G02B 2207/101; G02B 5/1885; G02B 5/201; G02B 5/204; G02F 2203/11; G02F 1/0147; G02F 1/01708; G02F 1/2257; G02F 2202/30; G02F 2202/32
USPC ....... 250/338.1, 504 R, 208.1; 257/432, 467; 359/245
See application file for complete search history.

(56) References Cited

U.S. PATENT DOCUMENTS

| | | | | |
|---|---|---|---|---|
| 2012/0181645 | A1* | 7/2012 | Espiau De Lamaestre | H01L 31/0232 257/432 |
| 2012/0235067 | A1* | 9/2012 | Araci | B82Y 20/00 250/504 R |
| 2014/0264712 | A1* | 9/2014 | Boutami | G01J 5/02 257/467 |
| 2014/0374574 | A1* | 12/2014 | Girard Desprolet | G02B 5/201 250/208.1 |
| 2015/0063739 | A1* | 3/2015 | Long | G02F 1/0126 385/1 |
| 2015/0226612 | A1* | 8/2015 | Palanchoke | G01J 5/20 374/121 |
| 2015/0293428 | A1* | 10/2015 | Ben-Abdallah | G02F 1/0147 250/504 R |
| 2016/0091371 | A1* | 3/2016 | Palanchoke | G01J 5/22 250/349 |
| 2017/0221596 | A1* | 8/2017 | Caldwell | G21K 5/00 |
| 2018/0045861 | A1* | 2/2018 | Caldwell | G01J 3/108 |
| 2019/0018263 | A1* | 1/2019 | Hassan | G02F 1/01708 |

OTHER PUBLICATIONS

Lefebvre et al., "Influence of emissivity tailoring on radiative membranes thermal behavior for gas sensing applications", Feb. 19, 2015, Sensors and Actuators B 213 (2015) 53-58 (Year: 2015).*

French Preliminary Search Report dated Jun. 18, 2018 in French Application 17 59565 filed Oct. 12, 2017 (with English Translation of Categories of Cited Documents).

Anthony Lefebvre, "Simulation et conception de microsources infrarouges nanophotoniques pour la détection de gaz," HAL archives-ouvertes, Dec. 2015, 122 Pages.

Anthony Lefebvre, et al., "Influence of emissivity tailoring on radiative membranes thermal behavior for gas sensing applications," Sensors and Actuators B: Chemical, Sensors and Actuators B 213, 2015, pp. 53-58.

Pierre Barritault, et al., "Mid-IR source based on a free-standing microhotplate for autonomous $CO_2$ sensin in indoor applications," Sensors and Actuators A: Physical, Sensors and Actuators A 172, 2011, pp. 379-385.

Jean-Jacques Greffet, et al., "Coherent emission of light by thermal sources," Nature, vol. 416, Macmillan Magazines Ltd, Mar. 2002, pp. 61-64.

* cited by examiner

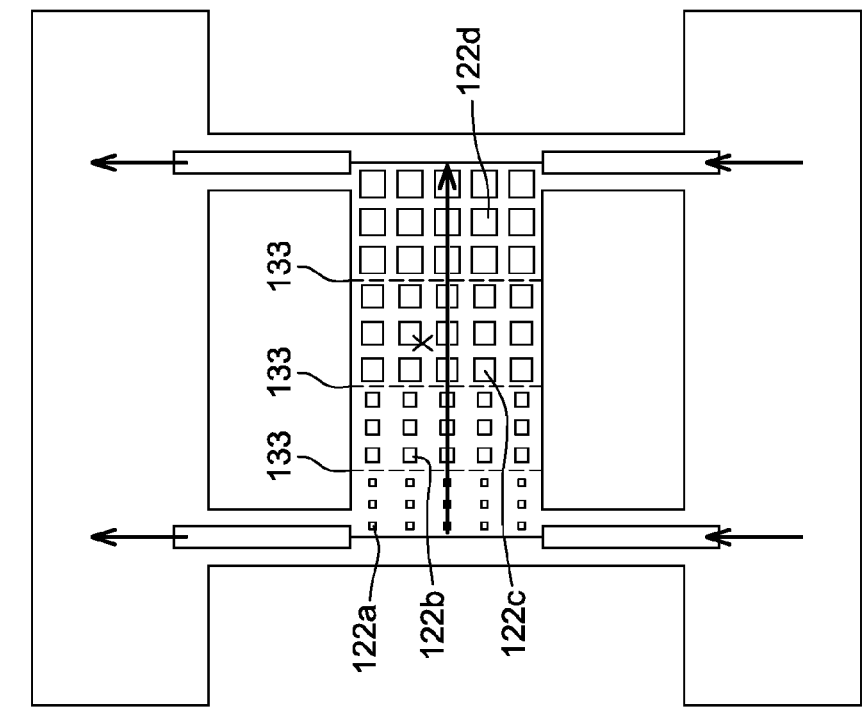
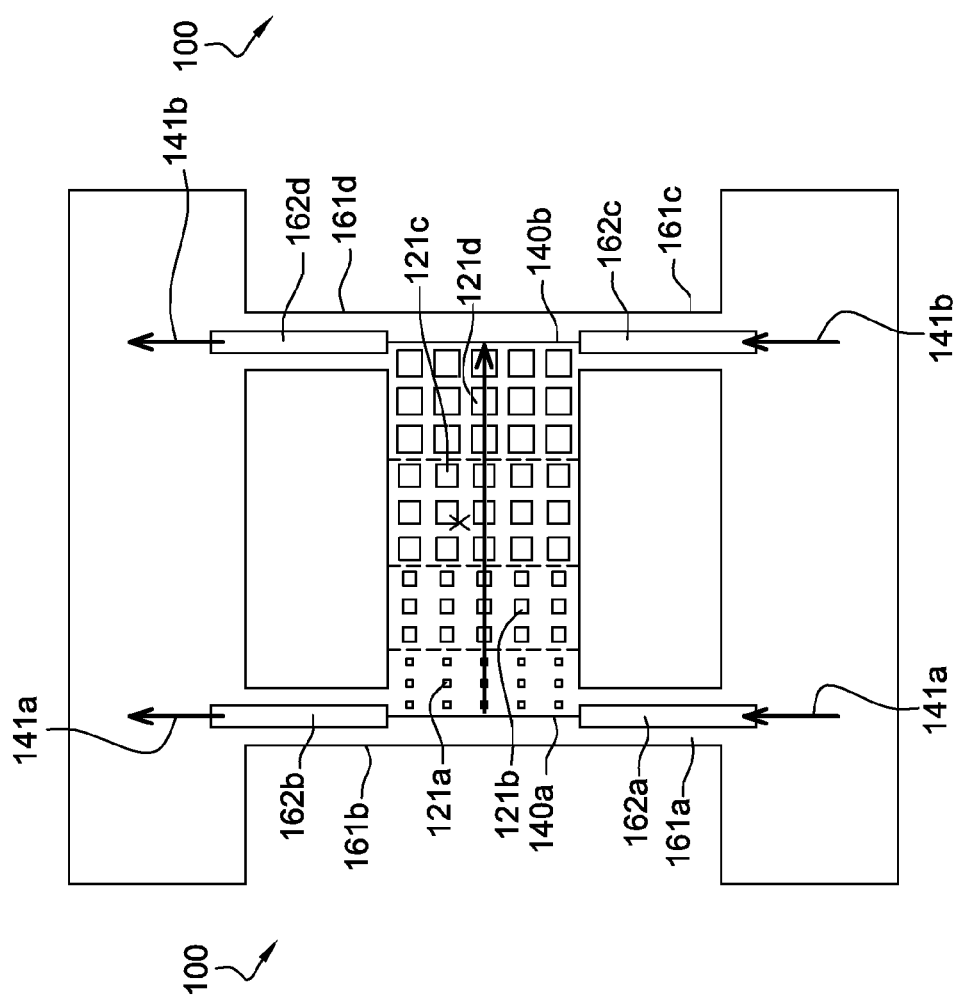

INFRARED RADIATION SOURCE

TECHNICAL DOMAIN

This invention relates to an infrared radiation source.

In particular, the invention relates to an infrared radiation source adapted to dynamically adjust the wavelength distribution of infrared radiation emitted by said source.

PRIOR ART

Non-Dispersive InfraRed (NDIR) sources are known in prior art, and are currently used in gas detectors.

For example, FIG. 1 illustrates an infrared micro-source known in prior art and described by Barritault et al. [1]. In particular, the infrared micro-source comprises a metallic filament formed on a membrane suspended by two suspension arms.

The metallic filament, when an electric current passes through it, is heated and emits infrared radiation according to the black body law.

However, this infrared source known in prior art is not satisfactory.

Such a source generally emits a broadband spectrum and therefore requires the use of a filter or filter means whenever an essentially monochromatic infrared radiation is required, particularly for gas detection.

In this respect, document [2] mentioned at the end of the description discloses the use of a matrix layout of metal pads located close to and facing the emissive surface of the infrared radiation source allowing emission of a narrow infrared spectrum, advantageously monochromatic at a central wavelength $\lambda_0$. In this respect, the central wavelength $\lambda_0$ depends on the size of the metal pads. The shape of the metal pads may be round or square, and they may be located close to the emissive surface.

In general, the metal pads are separated from the emissive surface by a dielectric layer with an refraction index n at the central wavelength $\lambda_0$, and thickness E less than $\lambda_0/10$. Furthermore, the largest dimension of the pads in an integer multiple of $\lambda_0/2n$.

An infrared radiation source provided with such a layout of metal pads enables emission of quasi-monochromatic and isotropic radiation, but only enables the detection of one gas when it is used in a gas detector. In other words, a gas detector using this type of source must be provided with as many radiation sources as there is gas to be detected.

Alternatively, document [3] mentioned at the end of the description discloses a spectral source dispersed by the use of a metallic grating located at the emissive surface of an infrared source.

However, the proposed arrangement can only emit infrared radiation with limited intensity at the wavelength of interest, because it is restricted to a small solid angle and therefore this solution is also not satisfactory.

Therefore the purpose of this invention is to disclose a source that could emit infrared radiation for which the intensities as a function of the wavelength can be dynamically adjusted

PRESENTATION OF THE INVENTION

The purpose of the invention is at least partly achieved by an infrared radiation source comprising a membrane, the membrane comprising:

an emissive layer, comprising an emissive surface, and intended to emit infrared radiation from said emissive surface when it is heated, a plurality of adaptation means, each adaptation means facing a different section of the emissive surface called the emissive section, and with which it forms an emissive assembly adapted to emit infrared radiation with a smaller spectral range than the infrared radiation that can be emitted by the emissive section alone, and centered around a central wavelength, said central wavelength being different from one emissive assembly to the other, a plurality of means of heating the emissive layer, the heating means being arranged so as to impose different relative temperature variations from one emissive section to the other.

According to one embodiment, the emissive layer is supported on a mechanical support on a face opposite the emissive surface.

According to one embodiment, the plurality of heating means comprises at least two metallic tracks that are heated when a current passes through them.

According to one embodiment, the two tracks are formed on the mechanical support and at a distance from the emissive layer.

According to one embodiment, the two metallic tracks are parallel to each other, and surround the emissive surface.

According to one embodiment, the mechanical support is provided with at least two attachment legs, advantageously at least four attachment legs.

According to one embodiment, the attachment legs are also provided with current inputs to supply power to the metallic tracks.

According to one embodiment, a dielectric layer with a refraction index n and a thickness E is inserted between the plurality of adaptation means and the emissive layer.

According to one embodiment, each adaptation means comprises at least one metallic pad supported on the dielectric layer, with a dimension w that is an integer multiple of the central wavelength associated with the emissive assembly considered divided by twice the refraction index of the dielectric layer at said central wavelength.

According to one embodiment, each adaptation means is at a spacing from the emissive surface equal to a distance less than one tenth of the central wavelength associated with the emissive assembly considered, and advantageously more than one fiftieth of said central wavelength.

According to one embodiment, the at least one metallic pad comprises a plurality of metal pads arranged in a matrix layout, for each adaptation means.

According to one embodiment, each adaptation means comprises the same number of metallic pads.

According to one embodiment, the at least one metallic pad comprises a metallic species chosen from among: platinum, gold, silver, titanium, titanium nitride, tungsten, palladium, tantalum, copper, aluminium, palladium, molybdenum.

According to one embodiment, each adaptation means comprises a filter, advantageously an interference filter.

According to one embodiment, the adaptation means are aligned along a direction A.

According to one embodiment, the emissive laser comprises one or more through trenches separating the emissive sections from each other.

According to one embodiment, the infrared radiation source is located in an chamber in which the environment is kept at a pressure of less than $10^{-2}$ mbars, preferably between $10^{-3}$ mbars and $10^{-2}$ mbars.

The invention also relates to a gas detector using the infrared radiation source according to this invention.

BRIEF DESCRIPTION OF THE DRAWINGS

Other characteristics and advantages will become clear in the following description of methods of manufacturing the infrared radiation source, given as non-limitative examples, with reference to the appended drawings in which:

FIGS. 4 and 5 are diagrammatic views of the infrared radiation source, on the front face (emissive surface) according to the invention.

DETAILED PRESENTATION OF PARTICULAR EMBODIMENTS

The invention described in detail below uses an infrared radiation source that comprises a plurality of adaptation means arranged facing an emissive layer that will emit infrared radiation when it is heated. In particular, the adaptation means with a section of the emissive surface called the emissive section forms an emissive assembly adapted to emit infrared radiation with a smaller spectral range than the infrared radiation that can be emitted by the emissive section alone, and centered around a central wavelength.

In other words, the infrared radiation with reduced spectral extent covers a range of continuous wavelengths smaller than that emitted by the emissive section alone. Therefore it is understood that an adaptation means, possibly in combination with the emissive section facing it, enables the emission of infrared radiation filtered in wavelengths relative to the radiation that will be emitted by the emissive section alone.

Said central wavelength is different for different emissive assemblies.

The source also comprises a plurality of means of heating the emissive layer.

In particular, the heating means are arranged so that a variable temperature gradient can be imposed on the emissive layer. In other words, the heating means are arranged so as to vary the relative distributions of infrared radiation wavelengths effectively emitted by each of the emissive assemblies.

The use of such a source in a gas detector makes said detector capable of detecting several gases (in other words no other source is required).

Figure 3:
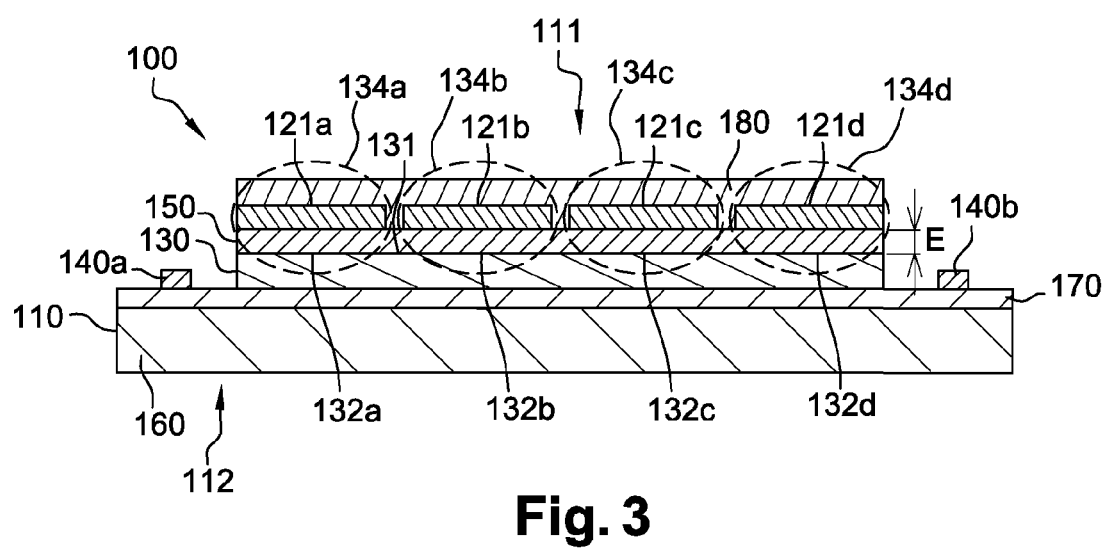
FIG. 3 is a diagrammatic view of the infrared radiation source according to a sectional plane perpendicular to the emissive surface according to the invention.

An infrared radiation source according to this invention can be seen on FIGS. 3 to 5.

The infrared radiation source comprises a membrane 110.

"Infrared radiation" means radiation of light in a range of wavelengths between 3 μm and 12 μm.

The membrane 110 comprises two essentially parallel faces called the front face 111 and the back face 112.

The membrane 110 comprises a plurality of adaptation means 121a, 121b, 121c, 121d and an emissive layer 130, from its front face 111 to its back face 112 (FIG. 3).

The emissive layer 130 comprises an emissive surface 131. In particular, the emissive layer 130 will emit infrared radiation from its emissive surface 131, when it is heated.

Figure 1:
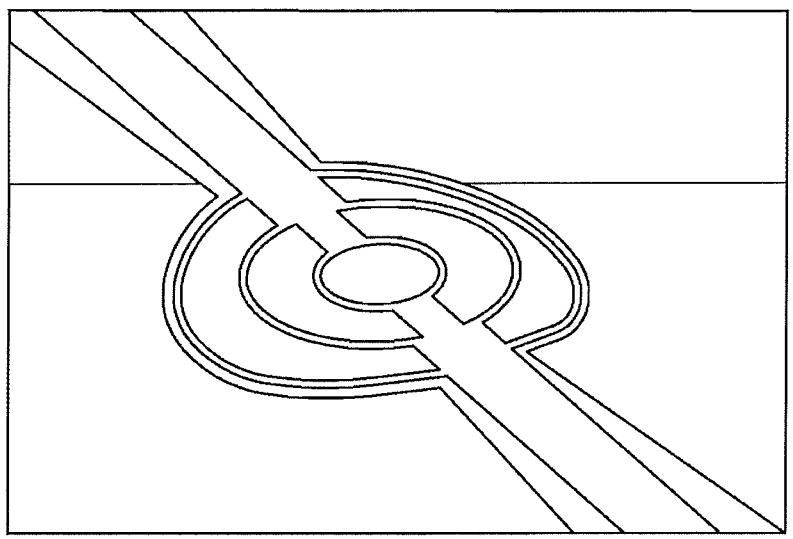
FIG. 1 is a diagrammatic view of a resistive element known in prior art.
Figure 2:
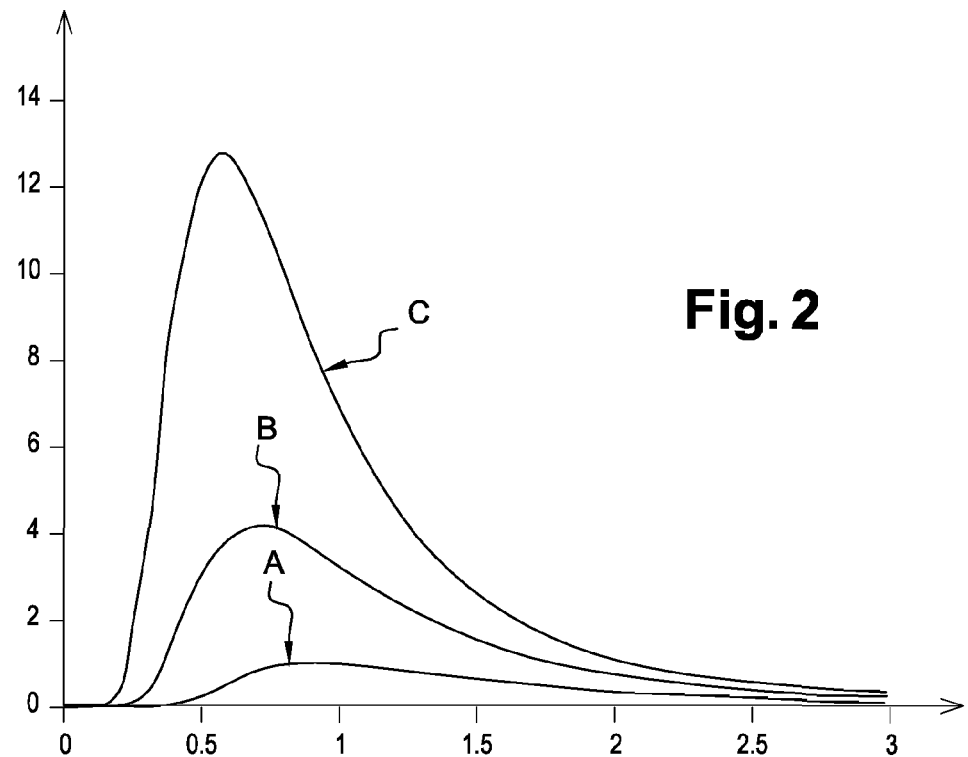
FIG. 2 is a graphic view of the intensity of infrared radiation (vertical axis) as a function of the wavelength (horizontal axis) emitted by a body heated to 3000 K (curve A), to 4000 K (curve B) and to 5000 K (curve C)

When heated, a body and in this case the emissive layer 130, emits infrared radiation according to Planck's law. In particular, the distribution in wavelengths (spectral distribution) of said infrared radiation is dependent on the temperature imposed on said body. In this context, FIG. 2 is a graphic view of the intensity of infrared radiation (vertical axis) as a function of the wavelength (horizontal axis) from a body heated to 3000 K (curve A), to 4000 K (curve B) and to 5000 K (curve C), A plurality of emissive sections 132a, 132b, 132c, 132d (FIG. 3) is defined at the emissive surface 131. The emissive sections 132a, 132b, 132c, 132d are different from each other. In other words, the emissive surface 131 is divided into a plurality of emissive sections 132a, 132b, 132c, 132d.

It is thus understood, although it is not necessary to clarify it, that whenever infrared radiation is emitted from a surface 131, it is also emitted from the emissive sections.

The emissive layer 130 may comprise a metallic species, and in particular the metallic species can be chosen from among tungsten, aluminium, copper, gold, silver, tantalum, titanium, palladium, molybdenum, platinum, titanium nitride.

The emissive layer 130 can be between about 10 nm and 200 nm thick.

A maximum thickness of the emissive layer 130 equal to 200 nm limits degradation of the mechanical strength of the membrane, and its mass (in other words its thermal inertia).

In particular, the emissive layer 130 may include a layer of platinum (Pt), for example 30 nm thick, intercalated between two layers of titanium nitride (TiN), for example 10 nm thick.

Each adaptation means 121a, 121b, 121c, 121d faces a different emissive section 132a, 132b, 132c, 132d. More particularly, each adaptation means 121a, 121b, 121c, 121d, together with the emissive section 132a, 132b, 132c, 132d facing it, forms an emissive assembly 134a, 134b, 134c, 134d.

In particular, each emissive assembly 134a, 134b, 134c, 134d is adapted to emit infrared radiation with a smaller spectral range than infrared radiation that could be emitted by the emissive section 132a, 132b, 132c, 132d alone, centered about a central wavelength.

Said central wavelength is different from one emissive assembly to the other.

In other words, each emissive assembly 134a, 134b, 134c, 134d is adapted to emit infrared radiation in a different range of wavelengths from that emitted in other emissive assemblies (therefore it is understood that each emissive assembly is associated with a given central wavelength. Furthermore, throughout this description, it could be considered that the central wavelength can equally well be associated with an emissive assembly as with the adaptation means from which it is composed).

The membrane 110 also comprises a plurality of heating means 140a, 140b (FIG. 3).

The heating means 140a, 140b are intended to heat the emissive layer 130.

In particular, the heating means 140a, 140b are arranged to impose a temperature gradient on the emissive layer 130 depending on the emissive surface 131 such that the temperature, and particularly the mean temperature, is different from one emission section to the other. Thus, when each emissive section 132a, 132b, 132c, 132d has a different temperature, the infrared emission spectrum is different from one emissive section to the other.

Through trenches 133 may be formed in the emissive layer 130 so as to separate the emissive sections 132a, 132b, 132c, 132d from each other (FIG. 5).

The plurality of heating means 140a, 140b (FIG. 4) may comprise at least two metallic tracks that are heated when a current passes through them. Although it is not necessary to clarify it, it is understood that the metallic tracks are also connected to current generating means. Said current generating means 141a, 141b may also be current sources, advantageously controlled current sources capable of varying the current passing along each of the metallic tracks.

The emissive layer may be supported through a face opposite the emissive surface 131, on a mechanical support 160 (FIG. 3). In this case, the metallic tracks 140a, 140b may be formed on or in the mechanical support, and preferably at a distance from the emissive layer. Additionally, a dielectric support layer 170 (FIG. 3) can be intercalated between the mechanical support 160 and the emissive layer 130.

Advantageously, the heating means 140a and 140b comprise two metallic tracks 140a and 140b approximately parallel to each other and that surround the emissive surface.

"Surrounding the emissive surface" means that two metallic tracks 140a and 140b are positioned from either side of the emissive surface.

The mechanical support may comprise a semiconducting material, for example silicon, or silicon nitride. However, it will be understood that the invention is not limited to this type of material.

The metallic tracks may comprise at least one metallic element chosen from among platinum, gold, silver, titanium, titanium nitride, tungsten, palladium, tantalum, copper, aluminium, palladium, molybdenum.

The mechanical support may be provided with at least two attachment legs 161a, 161b, 161c, 161d (FIG. 4). Advantageously, the attachment legs 161a, 161b, 161c, 161d are also provided with current inputs 162a, 162b, 162c, 162d (FIG. 4) that will supply current to the metallic tracks 140a, 140b.

Whenever only two attachment legs are considered, each can be provided with two current inputs 162a, 162b, 162c, 162d. According to this configuration, two current inputs arranged on an attachment leg are advantageously wide enough to avoid causing overheating of said legs and limiting heat exchanges between said inputs.

Four attachment legs, provided that each comprises one and only one current input, can give larger temperature gradients at the membrane, but can also limit or even prevent heat exchanges between the different current inputs.

A dielectric layer 150 (FIG. 3) with a refraction index n and a thickness E can be intercalated between the plurality of adaptation means 121a, 121b, 121c, 121d and the emissive layer 130. In other words, the dielectric layer is supported on the emissive surface 131.

The dielectric layer 150 may comprise a stack of dielectric materials.

In particular, each layer made of a dielectric material may comprise at least one element chosen from among silicon nitride, silicon dioxide.

For example, the dielectric layer 150 may comprise a stack of a 100 nm thick silicon oxide layer and a 100 nm thick silicon nitride layer.

According to a first embodiment, the adaptation means 121a, 121, 121c and 121d are filters, advantageously interference filters.

The choice of interference filter types and heir implementation will be known be an expert in the subject and therefore they are not described in detail.

According to a second embodiment, the adaptation means 121a, 121, 121c and 121d are metal-insulator-metal (MIM) plasmonic resonators.

In particular, a plasmonic resonator may include at least one metallic pad 122a, 122b, 122c, 122d supported on the dielectric layer 150 (FIG. 5).

For a given adaptation means, the metallic pads can have a dimension w that is an integer multiple of the central wavelength $\lambda_i$ associated with the emissive assembly considered divided by twice the refraction index n of the dielectric layer at said central wavelength ($w = m\lambda_i/(2n)$, where m is a non-zero positive integer).

Thus, the central wavelength associated with an emissive assembly comprising one or several metallic pads is determined by the dimension w of said metallic pad(s).

It is also clear that when each emissive assembly is associated with a central wavelength $\lambda_i$ different from that of the other emissive assemblies, the dimension w of at least one metallic pad of an adaptation means is different from the dimension w of at least one pad of the other adaptation means.

"Dimension of a pad" means the largest dimension of a pad, other than its thickness. For example, the largest dimension of a rectangular pad is its length, the largest dimension of a square pad is its side, and the largest dimension of a circle is its diameter.

It is also clear that the thickness of a metallic pad is its dimension along a direction perpendicular to the surface on which it is supported.

The thickness of metallic pads may be between 50 nm and 200 nm.

Furthermore, each adaptation means 121a, 121b, 121c, 121d is separated from the emissive surface 131 by a distance of less than one tenth of the central wavelength $\lambda_i$ of the adaptation means considered, and is advantageously more than one fiftieth of the central wavelength of the adaptation means considered.

Furthermore, when an adaptation means 121a, 121b, 121c, 121d comprises a plurality of metallic pads, these pads may be laid out in matrix form.

"Laid out in matrix form" refers to a regular and periodic arrangement of metal pads along two directions perpendicular to the plane formed by the emissive surface 131.

Each adaptation means 121a, 121b, 121c, 121d may comprise the same number of metallic pads 122a, 122b, 122c, 122d.

Each metallic pad 122a, 122b, 122c, 122d may comprise at least one metallic element chosen from among platinum, gold, silver, titanium, titanium nitride, tungsten, palladium, tantalum, copper, aluminium, palladium, molybdenum.

The metallic pads 122a, 122b, 122c, 122d can be covered with a protective dielectric layer 180 to prevent their oxidation if necessary.

The infrared radiation source may be located in a chamber in which the environment is kept at a pressure of less than $10^{-2}$ mbars, preferably between $10^{-3}$ mbars and $10^{-2}$ mbars.

According to one of the embodiments, the adaptation means can be in line along a direction X (FIGS. 4 and 5). In particular, when the metallic tracks 140a, 140b are approximately parallel, the X direction is perpendicular to said tracks.

During operation, the heating means and particularly the metallic tracks 140a and 140b, can impose an adjustable temperature on the emissive layer 130.

For illustration, the inventors have made thermal simulations (by finite elements, using the COMSOL software) so as to evaluate the temperature gradient along the X axis, as a function of pairs of currents (I1, I2) circulating in the metallic tracks (FIGS. 4 and 5).

For these simulations, the infrared radiation source uses the geometry illustrated in FIGS. 4 and 5. In particular, the emissive layer 130 includes a 30 nm thick platinum layer intercalated between two 10 nm thick layers of TiN. The infrared radiation source may also comprise a dielectric layer 150 made of a stack comprising a 10 nm thick layer of $SiO_2$ and a 10 nm thick layer of $Si_3N_4$.

Figure 6A:
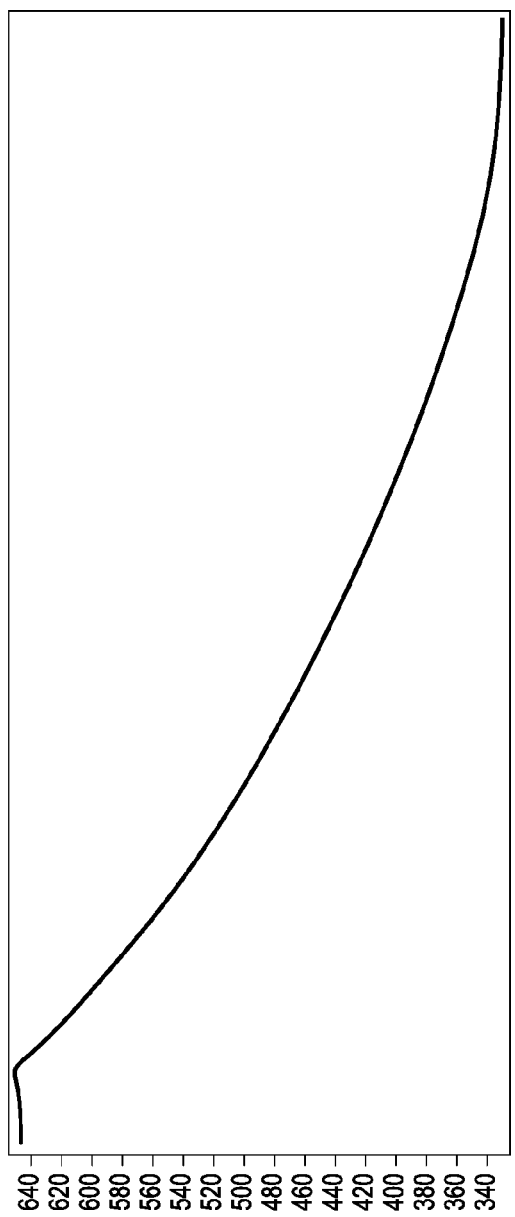
FIGS. 6a and 6b are graphic views of the temperature gradient (vertical axis) as a function of the position (horizontal axis) on the emissive surface (along the X axis represented on FIGS. 4 and 5) for two different sets of currents (I1, I2)
Figure 6B:
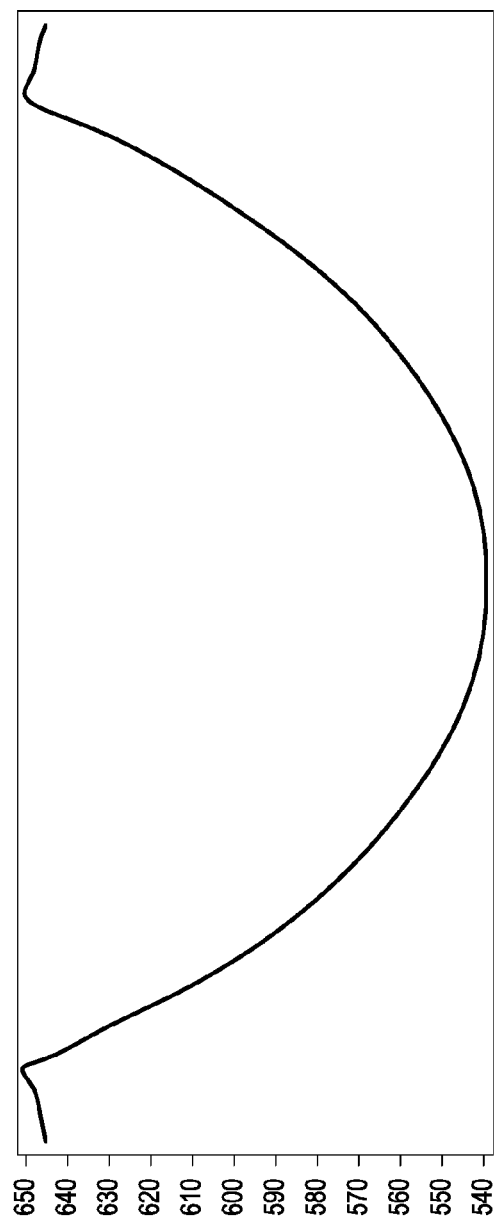

The simulation results, for 2 different sets of currents (I1, I2), are represented on FIGS. 6a and 6b.

In particular, the current I1 of the first current set (FIG. 6a) is adjusted to impose a temperature equal to 650° C. on the left side of the emissive surface of FIGS. 4 and 5. The current I2 is null such that, according to the simulation, the temperature on the right side of the emissive surface in FIGS. 4 and 5 is equal to 330° C.

The currents I1 and I2 of the second current sets (I1 and I2) are equal, and each is adjusted to impose a temperature equal to 650° C. on the left and right sides of the emissive surface of FIGS. 4 and 5. The result of the simulation, represented on FIG. 6b, very clearly shows that another temperature profile can be obtained with a smaller gradient.

It is thus demonstrated that the heating means can impose a temperature gradient on the emissive surface such that the temperature of each emissive section can be different to the temperature of the other emissive surfaces. In this way, each emissive section can emit infrared radiation for which the wavelength distribution is different from that of the other emissive sections (wavelength distribution means the weight represented by each wavelength in the spectrum actually emitted).

Nevertheless it is possible to amplify the temperature gradient from one emissive section to the next by forming through trenches in the emissive layer between each emissive section.

Figure 7A:
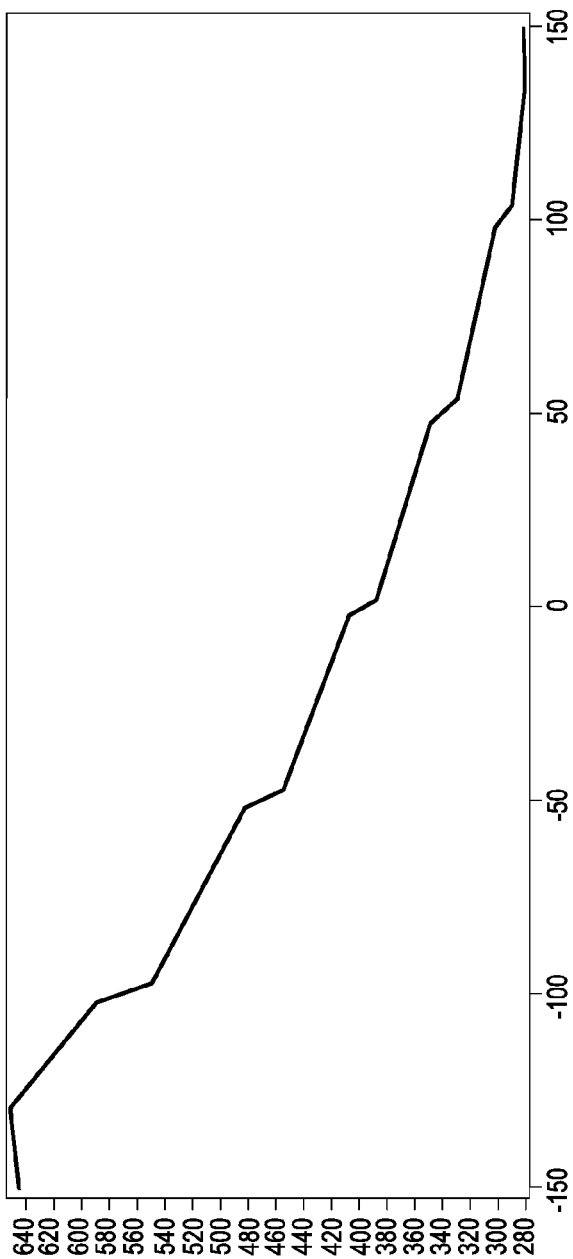
FIGS. 7a and 7b are graphic representations of the temperature gradient obtained using the methods in FIGS. 6a and 6b respectively, considering through sections separating the emissive sections from each other.
Figure 7B:
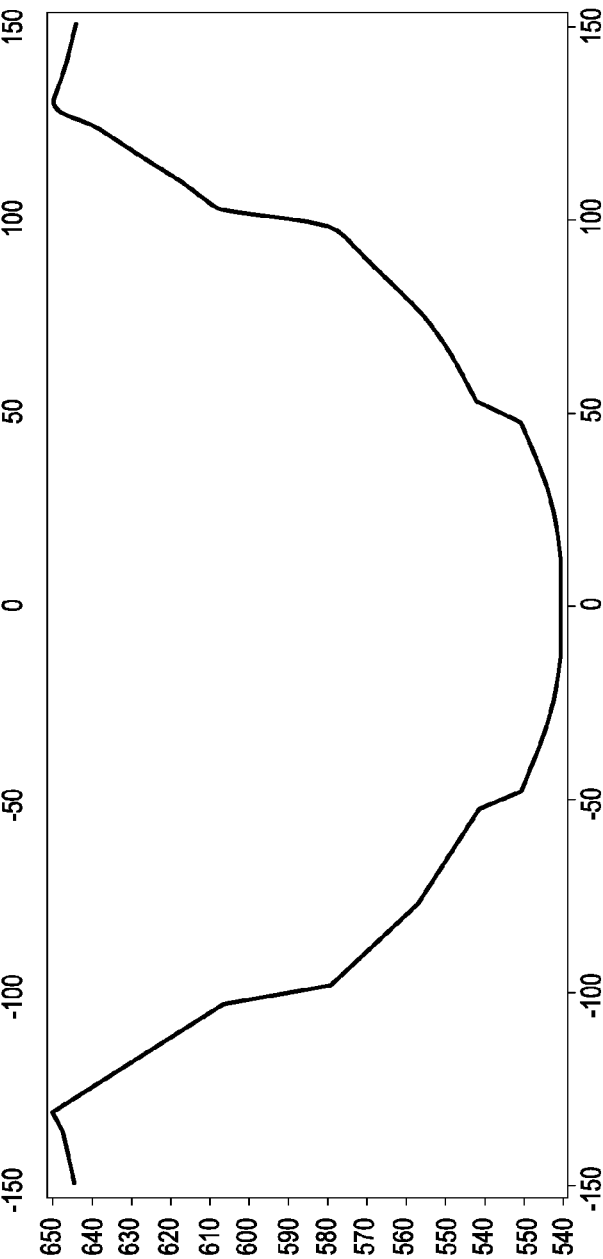

FIGS. 7a and 7b represent the results of thermal simulations according to the same methods as for FIGS. 6a and 6b respectively but considering trenches formed between the emissive sections.

On FIGS. 7a and 7b, changes in the temperature gradient are very clearly observed at the location of the through trenches (that interrupt the thermal bridge, or form a thermal resistance Moreover, the temperature gradient observed in the case in FIG. 7a is larger then that in FIG. 6a.

In the case in FIG. 7b, the currents I1 and I2 are equal, and the observed temperature gradient in this case is also higher than that observed in FIG. 6b.

Considering the above, the source 100 can emit infrared radiation composed of discrete "emission lines" for which the relative intensities depend on the quantity of heat supplied by the heating means to the emissive layer 130. In particular, each of the discrete "emission lines" is centered on a central wavelength $\lambda_i$.

For illustration, we will consider the infrared radiation source in FIG. 4 that comprises means 4 of adaptation of the central wavelength $\lambda_1$, $\lambda_2$, $\lambda_3$ and $\lambda_4$ respectively. In this example, the adaptation means 121a, 121b, 121c, 121d used correspond to the second embodiment and are in line along the X direction perpendicular to two metallic tracks 140a, 140b parallel to each other. Also in this example, the current circulating in the metallic track 140a is denoted I1 and the current circulating in the metallic track 140b is denoted I2.

FIGS. 8a to 8h then correspond to distributions of relative intensities of emission lines centered on wavelengths $\lambda_1$, $\lambda_2$, $\lambda_3$ and $\lambda_4$ for different sets of current values I1 and I2 circulating in metallic tracks 140a and 140b respectively.

Figure 8E:
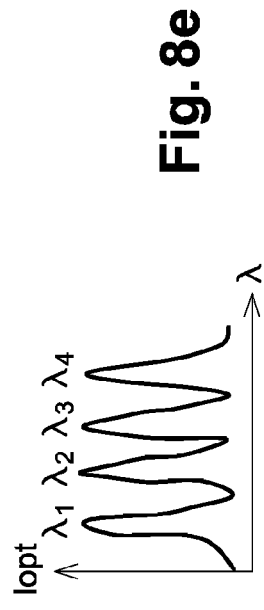
FIGS. 8e to 8h are diagrammatic views of distributions of relative intensities of emission lines centered on wavelengths $\lambda_1, \lambda_2, \lambda_3$ and $\lambda_4$ for different sets of current values I1 and I2 circulating in metallic tracks 140a and 140b respectively, assuming I2 constant for each of these figures, and I1 reducing from a value I1=I2 (FIG. 8a) to a value I1 very much less than I2.
Figure 8F:
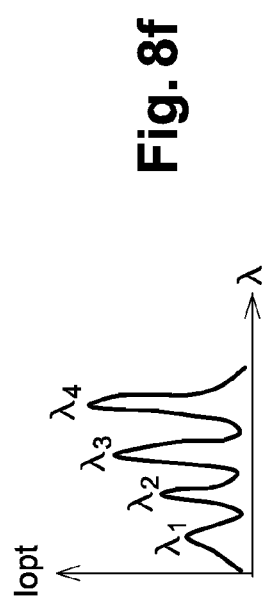
Figure 8G:
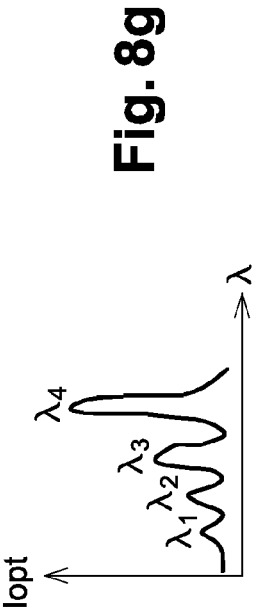
Figure 8H:
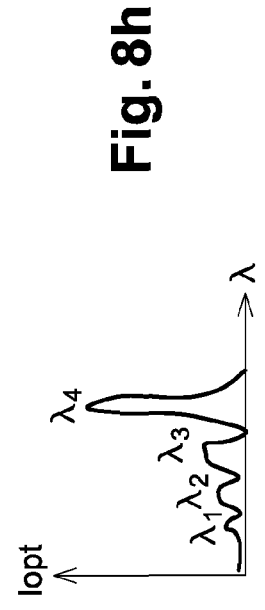
Figure 8A:
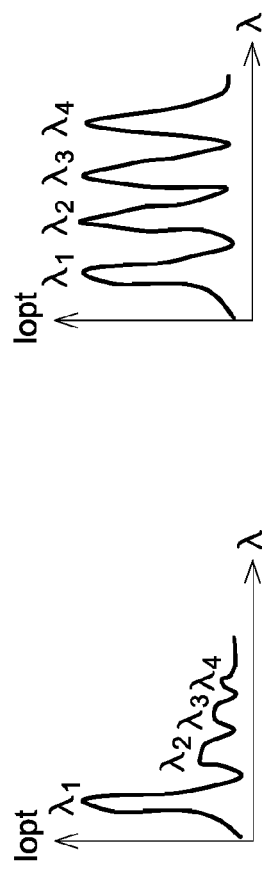
FIGS. 8a to 8d are diagrammatic views of distributions of relative intensities of emission lines centered on wavelengths $\lambda_1, \lambda_2, \lambda_3$ and $\lambda_4$ for different sets of current values I1 and I2 circulating in metallic tracks 140a and 140b respectively, assuming I1 constant for each of these figures, and I2 increasing from a value very much less than I1 (FIG. 8a) to a value I2=I1.
Figure 8B:
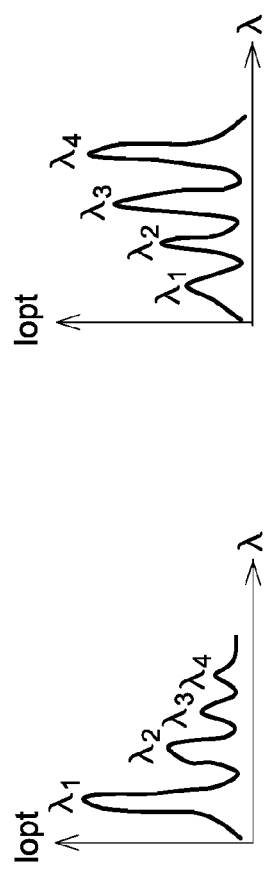
Figure 8C:
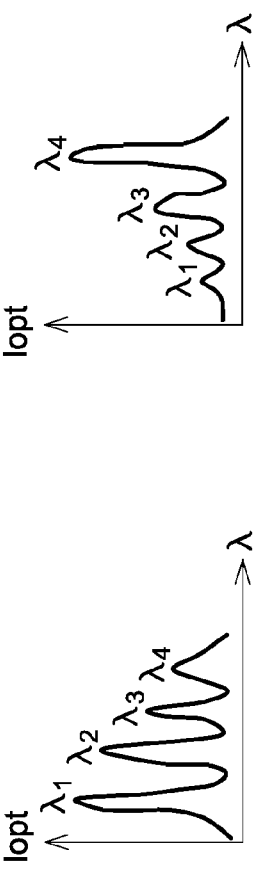
Figure 8D:
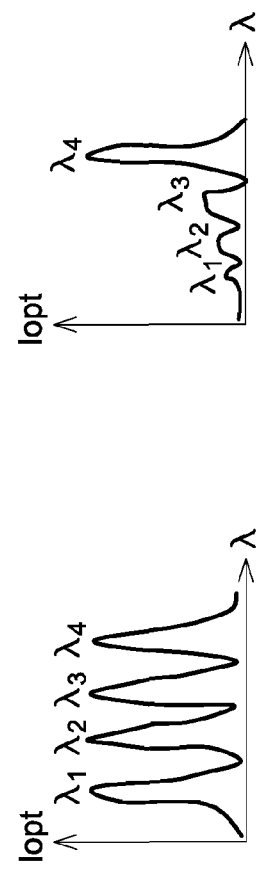

In particular, the intensity distributions in FIGS. 8a to 8d are obtained for a constant current I1, and a current I2 progressively increasing from a value very much less than I1, or even zero (FIG. 8a) to a value equal to I1 (FIG. 8d).

The intensity distributions in FIGS. 8e to 8h are obtained for a constant current I2, and a current I1 progressively reducing from a value equal to I2 (FIG. 8e), to a value equal to I2 or even zero (FIG. 8d).

Thus, it can clearly be seen that when the current I2 increases (with I1 constant, FIGS. 8a to 8d), the intensity of lines associated with central wavelengths $\lambda_2$, $\lambda_3$ and $\lambda_4$ increases until reaching an intensity similar to the line associated with wavelength $\lambda_1$.

It is also observed that when the current I1 reduces (with I2 remaining constant, FIGS. 8e to 8h), the intensity of lines associated with central wavelengths $\lambda_1$, $\lambda_2$ and $\lambda_3$ reduces This effect can advantageously be used to detect gases with different natures. In particular, gas can be detected by a detector comprising the infrared radiation source and an optical sensor (for example a pyrometer).

It is also understood that the detector comprises a chamber inside which the gas(es) can circulate. Said detector then comprises said source and an optical sensor (for example a pyrometer).

The use of such a detector for gas detection requires an appropriate measurement and signal processing procedure that we will describe below.

For example, consider 4 gases as described in the following table.

| Gas | Absorption wave length | Concentration | Absorption Capacity |
|---|---|---|---|
| Gas 1 | $\lambda 1$ | C1 | $\alpha 1$ |
| Gas 2 | $\lambda 2$ | C2 | $\alpha 2$ |
| Gas 3 | $\lambda 3$ | C3 | $\alpha 3$ |
| Gas 4 | $\lambda 4$ | C4 | $\alpha 4$ |

This example considers an infrared radiation source that comprises 4 means of adapting the central wavelength $\lambda_1$, $\lambda_2$, $\lambda_3$ and $\lambda_4$ respectively.

4 measurements for 4 different sets of currents (I1, I2) are then made. For each of the measurements, the optical powers Pi (i=1, 2, 3 or 4) measured by the optical sensor satisfy the following relations:

$$P_1 = P_{bck1} + a_{11}e^{-\alpha_1 C_1 L} + a_{12}e^{-\alpha_2 C_2 L} + a_{13}e^{-\alpha_3 C_3 L} + a_{14}e^{-\alpha_4 C_4 L} \quad (1)$$

$$P_2 = P_{bck2} + a_{21}e^{-\alpha_1 C_1 L} + a_{22}e^{-\alpha_2 C_2 L} + a_{23}e^{-\alpha_3 C_3 L} + a_{24}e^{-\alpha_4 C_4 L} \quad (2)$$

$$P_3 = P_{bck3} + a_{31}e^{-\alpha_1 C_1 L} + a_{32}e^{-\alpha_2 C_2 L} + a_{33}e^{-\alpha_3 C_3 L} + a_{34}e^{-\alpha_4 C_4 L} \quad (3)$$

$$P_4 = P_{bck4} + a_{41}e^{-\alpha_1 C_1 L} + a_{42}e^{-\alpha_2 C_2 L} + a_{43}e^{-\alpha_3 C_3 L} + a_{44}e^{-\alpha_4 C_4 L} \quad (4)$$

The terms $P_{bcki}$ (i=1, 2, 3 or 4), assumed to be known, designate the base power of the signal (namely the power not absorbed by gases). Due to the emissivity of MIMs, this base power does not drop all the way to 0 outside their resonant wavelength. It can vary from one temperature profile to another because the total luminance of the infrared radiation source can vary.

The coefficients aij, assumed to be known, simply designate the luminance ratios of the infrared radiation for each wavelength channel j (j=1, 2, 3 or 4) and for each measurement i (corresponding to a current set $I_1$, $I_2$).

Equations (1), (2), (3) and (4) can be rewritten in matrix form:

$$\begin{pmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{pmatrix} \begin{pmatrix} e^{-\alpha_1 C_1 L} \\ e^{-\alpha_2 C_2 L} \\ e^{-\alpha_3 C_3 L} \\ e^{-\alpha_4 C_4 L} \end{pmatrix} = \begin{pmatrix} P_1 - P_{bck1} \\ P_2 - P_{bck2} \\ P_3 - P_{bck3} \\ P_4 - P_{bck4} \end{pmatrix}$$

The values of the concentrations C1, C2, C3 and C4 can then be determined by inverting the previously described matrix system.

The algorithm presented does not form a limitation to this invention, and any mathematical method known to an expert in the subject that could satisfy the need to determine gas concentrations from a set of absorption measurements could then be considered.

However, it could be envisaged to make a number of measurements larger than the number of unknowns. The method of solving the previously described system of equations could also be combined with a least squares method.

The magnitudes $P_{bcki}$ (i=1, 2, 3 or 4), and aij (i=1, 2, 3 or 4, and i=1, 2, 3 or 4) can be deduced from optical simulations.

Alternatively, these magnitudes can also be obtained using a detector calibration procedure described below.

This procedure is described with reference to the device in FIG. 4.

Thus, a first set of currents (I1, I2), circulating in the metallic tracks 140a and 140b is considered initially.

The result of application of this first current set (I1, I2) is a first temperature profile of the conducting emissive surface. The emissive surface to which this first temperature profile is applied then emits infrared radiation for which the power, called the first power, is measured at the sensor, and satisfies the following relation:

$$P_1 = P_{bck1} + a_{11}e^{-\alpha_1 C_1 L} + a_{12}e^{-\alpha_2 C_2 L} + a_{13}e^{-\alpha_3 C_3 L} + a_{14}e^{-\alpha_4 C_4 L}$$

The Pbck1, a11, a12, a13, a14 parameters can be determined by absorption measurements for known gases for which concentrations are also known.

In particular, a least 5 sets of gases with different known gas concentrations can be considered (C1a, C2a, C3a, C4a, C5a), (C1b, C2b, C3b, C4b, C5b), (C1c, C2c, C3c, C4c, C5c), (C1d, C2d, C3d, C4d, C5d) and (C1e, C2e, C3e, C4e, C5e).

Thus, the following powers are measured at the sensor for the first set of currents (I1, I2), and for these 5 different sets of concentrations:

$$P_{1a} = P_{bck1} + a_{11}e^{-\alpha_1 C_{1a} L} + a_{12}e^{-\alpha_2 C_{2a} L} + a_{13}e^{-\alpha_3 C_{3a} L} + a_{14}e^{-\alpha_4 C_{4a} L}$$

$$P_{1b} = P_{bck1} + a_{11}e^{-\alpha_1 C_{1b} L} + a_{12}e^{-\alpha_2 C_{2b} L} + a_{13}e^{-\alpha_3 C_{3b} L} + a_{14}e^{-\alpha_4 C_{4b} L}$$

$$P_{1c} = P_{bck1} + a_{11}e^{-\alpha_1 C_{1c} L} + a_{12}e^{-\alpha_2 C_{2c} L} + a_{13}e^{-\alpha_3 C_{3c} L} + a_{14}e^{-\alpha_4 C_{4c} L}$$

$$P_{1d} = P_{bck1} + a_{11}e^{-\alpha_1 C_{1d} L} + a_{12}e^{-\alpha_2 C_{2d} L} + a_{13}e^{-\alpha_3 C_{3d} L} + a_{14}e^{-\alpha_4 C_{4d} L}$$

$$P_{1e} = P_{bck1} + a_{11}e^{-\alpha_1 C_{1e} L} + a_{12}e^{-\alpha_2 C_{2e} L} + a_{13}e^{-\alpha_3 C_{3e} L} + a_{14}e^{-\alpha_4 C_{4e} L}$$

The previously established equations can be written in matrix form to determine the parameters Pbck1, a11, a12, a13, a14:

$$\begin{pmatrix} P_{bck1} \\ a_{11} \\ a_{12} \\ a_{13} \\ a_{14} \end{pmatrix} = \begin{pmatrix} 1 & e^{-\alpha_1 C_{1a} L} & e^{-\alpha_2 C_{2a} L} & e^{-\alpha_3 C_{3a} L} & e^{-\alpha_4 C_{4a} L} \\ 1 & e^{-\alpha_1 C_{1b} L} & e^{-\alpha_2 C_{2b} L} & e^{-\alpha_3 C_{3b} L} & e^{-\alpha_4 C_{4b} L} \\ 1 & e^{-\alpha_1 C_{1c} L} & e^{-\alpha_2 C_{2c} L} & e^{-\alpha_3 C_{3c} L} & e^{-\alpha_4 C_{4c} L} \\ 1 & e^{-\alpha_1 C_{1d} L} & e^{-\alpha_2 C_{2d} L} & e^{-\alpha_3 C_{3d} L} & e^{-\alpha_4 C_{4d} L} \\ 1 & e^{-\alpha_1 C_{1e} L} & e^{-\alpha_2 C_{2e} L} & e^{-\alpha_3 C_{3e} L} & e^{-\alpha_4 C_{4e} L} \end{pmatrix}^{-1} \begin{pmatrix} P_{1a} \\ P_{1b} \\ P_{1c} \\ P_{1d} \\ P_{1e} \end{pmatrix}$$

The operation can then be reiterated several times considering other sets of currents (I1, I2) to determine the other parameters.

However, in practice it might be simpler to consider the set of gas concentrations and then to apply the different sets of currents (I1, I2) in sequence. The equations can then be created at the end of the measurements (current sets and concentration sets).

For example, the different sets of gas concentrations can consist of:
- no gas present in the chamber (Cia=0 for all values of i),
- all gases present, with concentrations such that the products αi.Cib are equal for all values of i,
- only one gas present in the chamber at any one time; at the same concentration as in the previous set (each gas is then changed).

These types of sets can then result in a very well defined system of equations.

All parameters Pbcki and aij can thus be determined and then used in the gas concentration determination model presented above.

The inventors also used a digital simulation to demonstrate that a gas detector composed of the infrared radiation source was sufficiently sensitive to detect the gases and determine their concentrations.

The inventors also used the RCWA ("Rigorous coupled-wave analysis") method to simulate a given source for different pairs of currents I1, I2.

The source considered for the RCWA simulation comprises three adaptation means, called the first adaptation means, the second adaptation means and the third adaptation means, with central wavelengths of 4.2 µm, 5.25 µm, and 6.15 µm respectively. These central wavelengths can be used to detect $CO_2$, NO and $NO_2$ gases.

The first, second and third adaptation means include metal pads with sizes of 800 nm, 1100 nm and 1400 nm respectively (for each adaptation means) the metallic pads are arranged in a matrix layout at a period of 2.5 µm).

Figure 9:
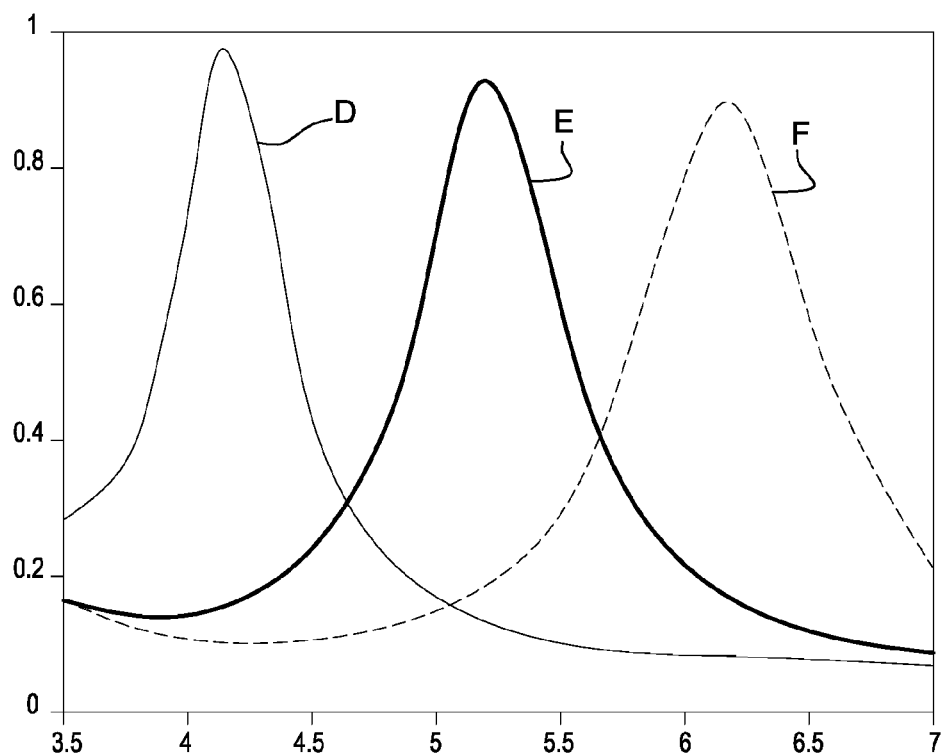
FIG. 9 is a graphic view of emissivities (vertical axis), as a function of the wavelength (horizontal axis, in μm), of the first, second and third adaptation means formed from metallic pads with sizes of 800 nm (curve D), 1100 nm (curve E), and 1400 nm (curve F) respectively.

The emissivities of the first, second and third adaptation means are shown on curves D, E, and F respectively on FIG. 9.

For a given temperature profile, the product of Planck's spectral law multiplied by the emissivity of each adaptation means can be used to calculate the spectral distribution.

Figure 10:
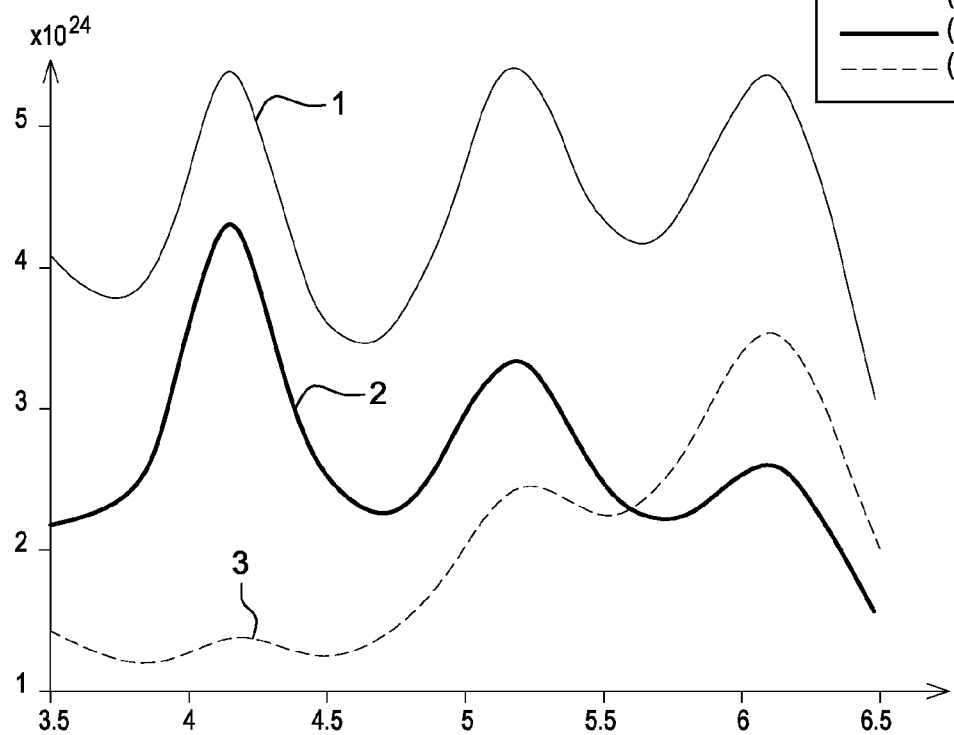
FIG. 10 is a graphic view of the spectral distribution (vertical axis) as a function of the wavelength (horizontal axis) of a source provided with three adaptation means of FIG. 9, and for different temperature gradients.

In particular, FIG. 10 is a graphic representation of the spectral distribution of the source (provided with the three adaptation means described above) for different temperature gradients given in the following able.

|  | Left temperature (K) | Right temperature (K) |
| --- | --- | --- |
| Curve 1 | 923 | 923 |
| Curve 2 | 923 | 603 |
| Curve 3 | 603 | 923 |

On curve 1, 3 quasi equivalent amplitude peaks can be observed for each of the three wavelengths.

However, when a temperature gradient is applied to the emissive layer (curves 2 and 3), a relative variation of the different peaks can be observed.

Moreover, the continuous background can be observed on each of the curves 1, 2 and 3.

These effects can be compensated by homogenising the temperature to a value smaller than 923K, typically 800K, and by making temperature gradients asymmetric at different values. This is visually promising to compare spectral templates but is not strictly required for signal processing.

Still within the framework of this invention, and particularly in relation to the second embodiment, a continuous gradient of metallic pads can be considered (in other words a layout of adaptation means for which the central wavelengths vary continuously). For example, it may consist of rows of metallic pads, each row being perpendicular to the X axis. The sizes of metal pads can vary linearly from 500 nm to 1500 nm in steps of 10 nm, and at a pseudo-period of 2.5

This type of architecture provides access to a range of spectra that can make it possible to determine the concentration of different gases, in the spectral extent zone, by signal processing.

Figure 11:
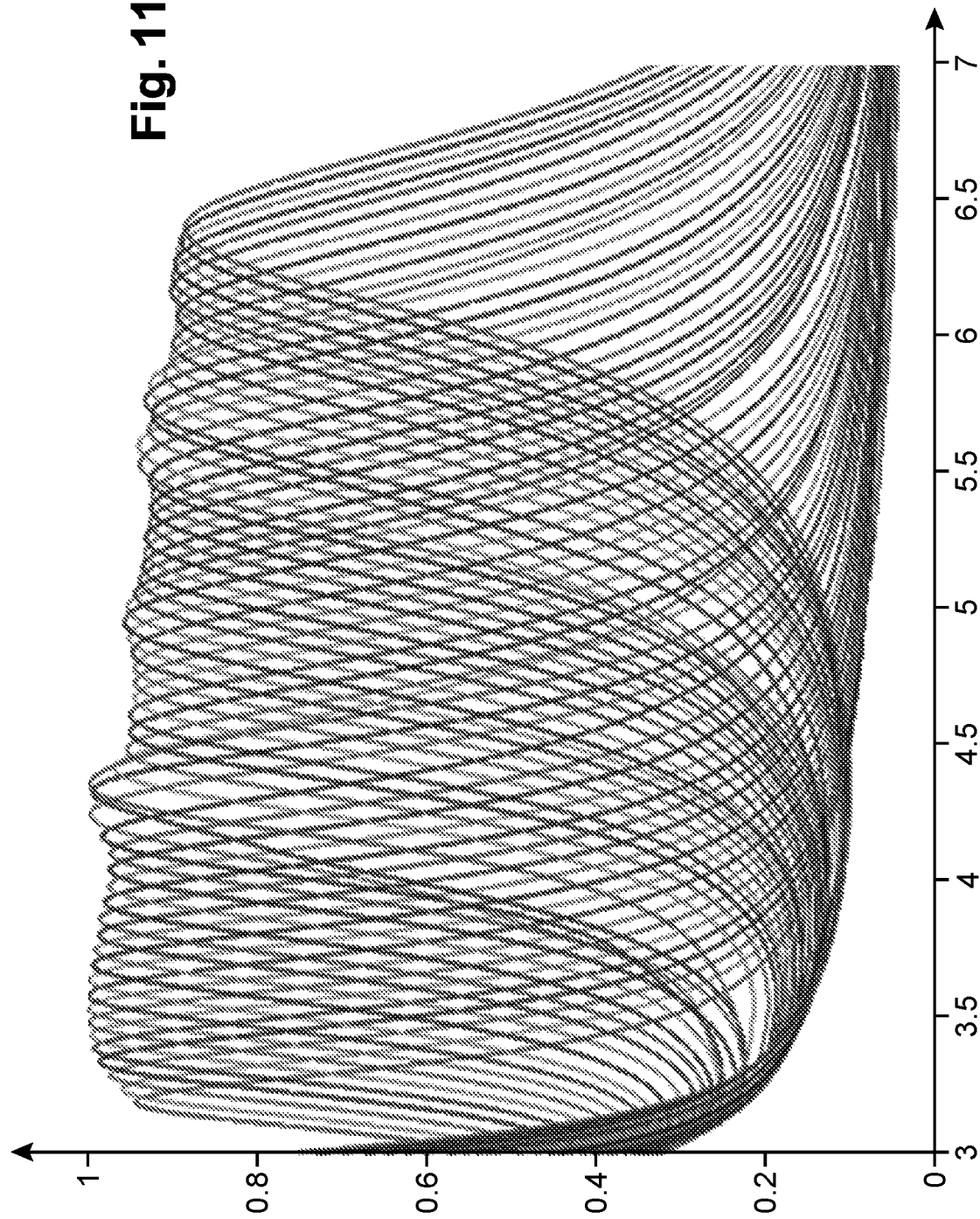
FIG. 11 is a graphic view of the emissivities (vertical axis) of different emissive assemblies, as a function of the wavelength (horizontal axis in μm), each emissive assembly comprising an adaptation means composed of a row of pads with a different size and perpendicular to the X direction, in particular all curves are represented for pad sizes varying from 500 nm to 1500 nm in steps of 10 nm.

FIG. 11 shows emissivities accessible with this architecture. In particular, each of the curves in FIG. 11 represents the emissivity of an emissive assembly comprising a range of metallic pads of a given size.

Figure 12:
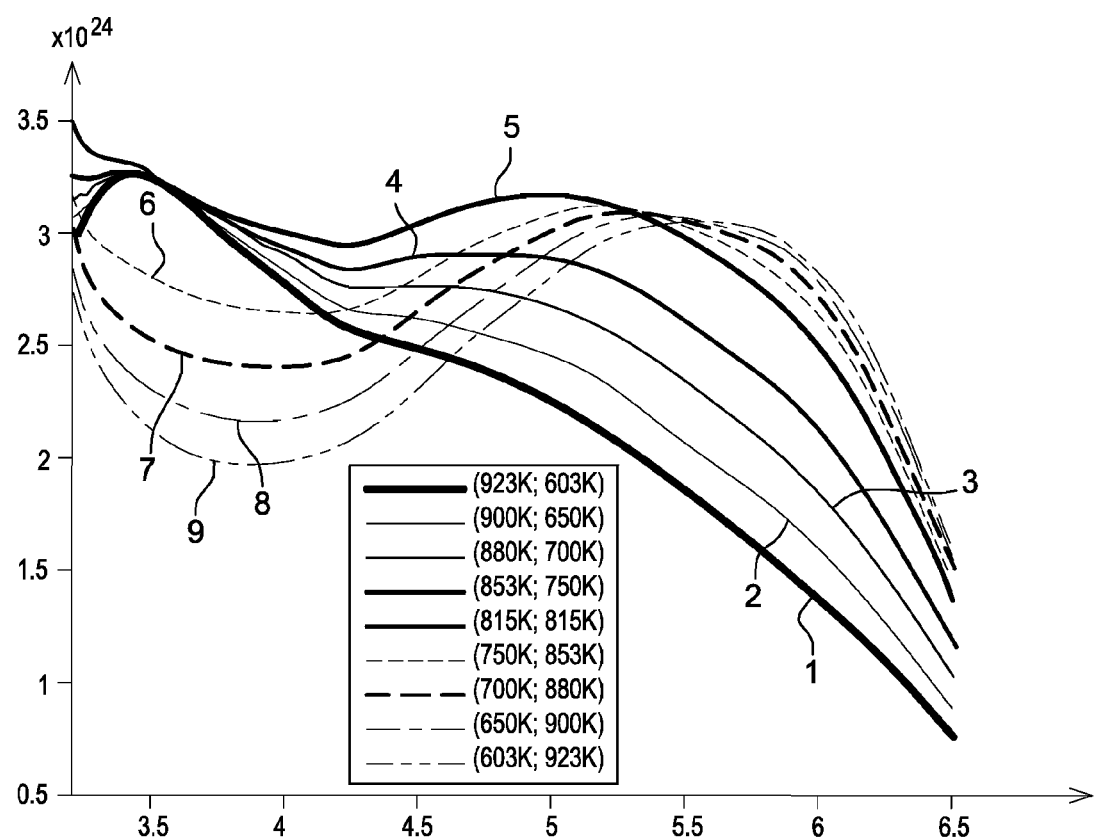
FIG. 12 is a graphic representation of the spectral distribution (vertical axis) as a function of the wavelength (horizontal axis) for different temperature gradients, for a source provided with rows of pads perpendicular to the X direction, the rows of pads being arranged by increasing pad size along the X direction, said size covering the range of sizes 500 nm-1500 nm in steps of 10 nm.

Application of temperature gradients indicated in the inset in FIG. 12 enables access to the spectral distributions represented in FIG. 12, and signal processing can give the concentration of the different gases, with absorption lines between λ=3.3 µm (eg CH4) and λ=6.15 µm (eg NO2).

REFERENCES

[1] Pierre Barritault et al., "*Mid-IR source based on a free-standing microhotplate for autonomous $CO_2$ sensing in indoor applications*", Sensors and Actuators A, 172, p. 379-385, (2011).
[2] Anthony Lefebvre et al., "*Influence of emissivity tailoring on membranes thermal behavior for gas sensing applications*", Sensor and Actuators B, 213, p. 53-58, (2015).
[3] Jean-Jacques Greffet et al., "*Coherent emission of light by thermal sources*", Nature, 416(6876), 61-64, (2002),

The invention claimed is:

1. An infrared radiation source (100) comprising a membrane, the membrane comprising:
    an emissive layer (130), comprising an emissive surface (131), which emits infrared radiation from said emissive surface (131) when it is heated;
    a plurality of adaptation means (121a, 121b, 121c, 121d), each adaptation means (121a, 121b, 121c, 121d) facing a different section of the emissive surface (131) called the emissive section (132a, 132b, 132c, 132d), and with which it forms an emissive assembly (134a, 134b, 134c, 134d) that emits infrared radiation with a smaller spectral range than the infrared radiation that can be emitted by the emissive section (132a, 132b, 132c, 132d) alone, and centered around a central wavelength, said central wavelength being different from one emissive assembly to the other,
    a plurality of means (140a, 140b) of heating the emissive layer (130), the heating means (140a, 140b) being arranged so as to impose a variable temperature gradient on the emissive layer so as to vary the relative distributions of infrared radiation wavelengths effectively emitted by each of the emissive assemblies (134a, 134b, 134c, 134d).

2. The source according to claim 1, wherein each adaptation means (121a, 121b, 121c, 121d) comprises a filter.

3. The source according to claim 1, wherein the adaptation means (121a, 121b, 121c, 121d) are in line.

4. The source according to claim 1, wherein the emissive layer (130) comprises one or more through trenches (133) separating the emissive sections (132a, 132b, 132c, 132d) from each other.

5. The source according to claim 1, wherein the infrared radiation source is located in a chamber in which the environment is kept at a pressure of less than $10^{-2}$ mbars.

6. A gas detector comprising:
the infrared radiation source according to claim 1; and
an optical sensor.

7. The source according to claim 1, wherein each adaptation means (121a, 121b, 121c, 121d) comprises an interference filter.

8. The source according to claim 1, wherein the emissive layer (130) is supported on a mechanical support (160) on a face opposite the emissive surface (131).

9. The source according to claim 8, wherein the plurality of heating means (140a, 140b) comprises at least two metallic tracks that are heated when a current passes through them.

10. The source according to claim 9, wherein the two metallic tracks are parallel to each other, and surround the emissive surface (131).

11. The source according to claim 8, wherein the two tracks are formed on the mechanical support (160) and at a distance from the emissive layer (130).

12. The source according to claim 8, wherein the mechanical support (160) is provided with at least two attachment legs (161a, 161b, 161c, 161d).

13. The source according to claim 12, wherein the plurality of heating means (140a, 140b) comprises at least two metallic tracks that are heated when a current passes through them, and in which the attachment legs are also provided with current inputs (162a, 162b, 162c, 162d) to supply power to the metallic tracks.

14. The source according to claim 8, wherein a dielectric layer (150) with a refraction index n and a thickness E is intercalated between the plurality of adaptation means (121a, 121b, 121c, 121d) and the emissive layer 130.

15. The source according to claim 14, each adaptation means (121a, 121b, 121c, 121d) comprises at least one metallic pad supported on the dielectric layer (150), with a dimension w that is an integer multiple of the central wavelength associated with the emissive assembly (134a, 134b, 134c, 134d) considered divided by twice the refraction index of the dielectric layer at said central wavelength.

16. The source according to claim 15, wherein h each adaptation means (121a, 121b, 121c, 121d) is at a spacing from the emissive surface (131) equal to a distance less than one tenth of the central wavelength associated with the emissive assembly (134a, 134b, 134c, 134d) considered.

17. The source according to claim 16, wherein each adaptation means (121a, 121b, 121c, 121d) comprises the same number of metallic pads (122a, 122b, 122c, 122d).

18. The source according to claim 15, wherein the at least one metallic pad comprises a plurality of metal pads (122a, 122b, 122c, 122d) arranged in a matrix layout, for each adaptation means (121a, 121b, 121c, 121d).

19. The source according to claim 15, wherein the at least one metallic pad comprises a metallic species selected from the group consisting of platinum, gold, silver, titanium, titanium nitride, tungsten, palladium, tantalum, copper, aluminium, palladium, and molybdenum.

20. The source according to claim 15, wherein h each adaptation means (121a, 121b, 121c, 121d) is at a spacing from the emissive surface (131) equal to a distance more than one fifteenth and less than one tenth of the central wavelength associated with the emissive assembly (134a, 134b, 134c, 134d) considered.

21. The source according to claim 8, wherein the mechanical support (160) is provided with at least four attachment legs (161a, 161b, 161c, 161d).

22. The source according to claim 1, wherein the infrared radiation source is located in a chamber in which the environment is kept at a pressure between $10^{-3}$ mbars and $10^{-2}$ mbars.

* * * * *